(12) United States Patent
Bonnstetter et al.

(10) Patent No.: US 7,249,372 B1
(45) Date of Patent: Jul. 24, 2007

(54) NETWORK BASED DOCUMENT DISTRIBUTION METHOD

(75) Inventors: Bill J. Bonnstetter, Scottsdale, AZ (US); David R. Bonnstetter, Phoenix, AZ (US); Rodney Cox, Gatesville, TX (US)

(73) Assignee: Target Training International Performance Systems, Scottsdale, AZ (US)

( * ) Notice: Subject to any disclaimer, the term of this patent is extended or adjusted under 35 U.S.C. 154(b) by 1175 days.

(21) Appl. No.: 09/760,145

(22) Filed: Jan. 12, 2001

Related U.S. Application Data

(60) Provisional application No. 60/176,420, filed on Jan. 14, 2000.

(51) Int. Cl.
*G06F 7/04* (2006.01)
*G06F 11/34* (2006.01)
*H04L 9/32* (2006.01)
*H04L 9/00* (2006.01)

(52) U.S. Cl. ............... 726/5; 726/27; 713/183; 705/11; 705/51; 705/76

(58) Field of Classification Search ........ 713/200–202, 713/183
See application file for complete search history.

(56) References Cited

U.S. PATENT DOCUMENTS

| | | | | |
|---|---|---|---|---|
| 5,423,034 A | * | 6/1995 | Cohen-Levy et al. | 707/10 |
| 5,537,544 A | * | 7/1996 | Morisawa et al. | 713/202 |
| 5,551,880 A | | 9/1996 | Bonnstetter et al. | |
| 5,678,042 A | * | 10/1997 | Pisello et al. | 714/47 |
| 5,742,683 A | * | 4/1998 | Lee et al. | 705/60 |
| 6,119,097 A | * | 9/2000 | Ibarra | 705/11 |
| 6,141,778 A | * | 10/2000 | Kane et al. | 713/201 |
| 6,282,404 B1 | * | 8/2001 | Linton | 434/350 |
| 6,490,687 B1 | * | 12/2002 | Nagai | 713/202 |
| 6,513,042 B1 | * | 1/2003 | Anderson et al. | 707/102 |
| 6,544,476 B1 | * | 4/2003 | Mimura et al. | 422/67 |
| 6,556,974 B1 | * | 4/2003 | D'Alessandro | 705/10 |
| 6,594,668 B1 | * | 7/2003 | Hudy | 707/101 |
| 6,735,574 B2 | * | 5/2004 | Bull | 705/32 |
| 6,742,002 B2 | * | 5/2004 | Arrowood | 707/104.1 |

(Continued)

FOREIGN PATENT DOCUMENTS

WO       WO0055792       *   9/2000

OTHER PUBLICATIONS

George, Joey, The Multi-dimensionality of Computer-Based Monitoring in the Workplace, 1993, IEEE, pp. 609-619.*

(Continued)

*Primary Examiner*—Ayaz Sheikh
*Assistant Examiner*—Aravind K. Moorthy
(74) *Attorney, Agent, or Firm*—McKee, Voorhees & Sease, P.L.C.

(57) ABSTRACT

A method of distributing documents includes the step of displaying the documents on a web site. Responses to the documents are accepted on the web site. After the responses have been accepted, they are processed into a report and the report is returned to an interested party. It is to be understood that the surveys or other forms to be completed by users could be filled out on paper manually and the results could then be entered into a computer and sent to the web site. The reports could be electronically transmitted, and/or hard copies sent via mail, overnight, or through other modes.

11 Claims, 17 Drawing Sheets

U.S. PATENT DOCUMENTS

| | | | |
|---|---|---|---|
| 6,775,781 B1* | 8/2004 | Phillips et al. | 713/200 |
| 6,810,383 B1* | 10/2004 | Loveland | 705/9 |
| 6,853,975 B1* | 2/2005 | Dirksen et al. | 705/11 |
| 7,113,933 B1* | 9/2006 | Imholte | 707/1 |
| 2002/0019765 A1* | 2/2002 | Mann et al. | 705/11 |
| 2002/0184085 A1* | 12/2002 | Lindia et al. | 705/11 |
| 2003/0101091 A1* | 5/2003 | Levin et al. | 705/11 |
| 2003/0229529 A1* | 12/2003 | Mui et al. | 705/8 |
| 2004/0098285 A1* | 5/2004 | Breslin et al. | 705/1 |
| 2004/0107112 A1* | 6/2004 | Cotter | 705/1 |
| 2004/0143489 A1* | 7/2004 | Garman | 705/11 |
| 2004/0215503 A1* | 10/2004 | Allpress et al. | 705/11 |
| 2005/0021391 A1* | 1/2005 | Lu et al. | 705/11 |
| 2007/0050238 A1* | 3/2007 | Carr et al. | 705/11 |

OTHER PUBLICATIONS

Luo, Hui, A Server-Independent Password Authentication Method for Acess-Controlled Web Pages, 2000, IEEE, pp. 361-364.*

Kelly, Shauna, Password Confidential, 2005, Intheblack, pp. 42-45.*

Scott B. Parry, *Just What Is a Competency? (And Why Should You Care?)*, TRAINING—magazine, Jun. 1998 issue, article beginning at p. 58 (5 pages total including magazine cover).

Andrew L. Klein, *Validity and reliability for competency-based systems: Reducing litigation risks*, global computer network download printout, Copyright 1998, Infonautics Corporation, (11 pages total).

Article from USA WEEKEND entitled *Working Smart*, Oct. 2-4, 1998 edition, pp. 4-5.

*LOMA's Competency Dictionary*, cover page, inside cover page with 1998 copyright notice, and table of contents, and three pages therefrom (6 pages total).

Stephen C. Schoonover, *Competencies for the Year 2000, IA professional's Toolkit for Performance Development*, The Schoonover Group, Cover page, inside cover page, p. I with copyright notice of 1998, p. iii table of contents, back cover page listing The Shoonover Group as publisher, (5 pages total).

Daniel Goleman, *Emotional Intelligence*, cover page and table of contents (3 pages total).

Daniel Goleman, *Working with Emotional Intelligence*, cover page and table of contents (3 pages total).

Bradford D. Smart, *Top grading—How Leading Companies Win by Hiring, Coaching and Keeping the Best People*, cover page and table of contents (4 pages total).

*Performance Skills Leader, Participant Package*, Human Technology, Inc., HRD Press, 11 pages.

*Factsheet*, DDI Development Dimensions International, *Leadership Development Through Assessment Centers*, copyright MCMXCIII, 2 pages.

Michael M. Lomabrdo & Robert W. Eichinger: *The Leadership Architect® Suite of Integrated Tools*, Lominer Limited, Inc., copyright 1995, , cover page, insider cover page, p. 1 table of contents, pp. 7-14 (11 total pages).

*Skillscape, Competency Manager™*, cover page, inside cover page, three additional pages (5 total pages: 3318 Oak Street, Suite 19, Victoria, B.C., Canada V8X 1R1.

*Skillscape, Overview of Skillscape Competency Manager™*, cover page, table of contents, and pp. 1-15 (17 total pages); 3318 Oak Street, Suite 19, Victoria, B.C., Canada V8X 1R1.

* cited by examiner

NETWORK BASED DOCUMENT DISTRIBUTION METHOD

CROSS-REFERENCE TO RELATED APPLICATIONS

Reference is made under 35 U.S.C. § 119(e) to U.S. Provisional Application Ser. No. 60/176,420, filed Jan. 14, 2000.

INCORPORATED BY REFERENCE

U.S. Pat. No. 5,551,880 is hereby incorporated by reference in its entirety.

U.S. Ser. No. 09/479,646, filed Jan. 7, 2000 is hereby incorporated by reference in its entirety.

BACKGROUND OF THE INVENTION

1. Field of the Invention

The present invention relates to a method of distributing and collecting documents over a network such as the Internet. The present invention also relates to a method of doing business over the Internet.

2. Problems in the Art

Employee evaluation firms sell, or license, or otherwise market, employee evaluation forms and employee evaluation systems to other businesses. These forms are designed to evaluate potential and existing employees based on traits which "good" employees in the given job position usually possess. In the usual manner, these forms are sold to businesses that utilize the forms to evaluate their employees. The employee evaluation firms may process and analyze the forms for the various businesses. Forms are usually delivered to the businesses printed on paper. Employee evaluation forms are usually either sold to the businesses with independent contractors or through a sales force employed by the employee evaluation firms.

By selling employee evaluation forms to businesses and delivering these forms on printed paper to the businesses, significant costs are associated with the paper production and the shipping of the paper. In addition to the paper costs, the employee evaluation firms give up a significant degree of control over the proprietary information that is embodied in the forms that are sold to businesses. The forms that businesses do purchase also are often not utilized efficiently as many forms are lost before ever being filled out by an employee or are lost after an employee fills out the form.

Employee evaluation firms also face risk by embodying their forms in a paper form and having a sales staff sell these forms. There is a risk that a sales person or staff will use the information embodied in the forms to develop a competing business. In addition, when an independent contractor is employed to sell the employee evaluation forms to businesses, the employee evaluation firm often has little or no direct interaction with the business that is actually using its forms. There is a need in the art for a method which allows an employee evaluation firm to sell its employee evaluation forms to businesses while eliminating the costs associated with putting these forms on paper. In addition, there is a need in the art for a method which allows employee evaluation firms greater control over their proprietary forms. Similar problems exist for any system or method using documents or forms that need to be processed at a remote location.

Therefore, it is a primary object of the present invention to provide a network based document distribution method that solves problems and deficiencies in the art.

It is a further object of the present invention to provide a document distribution method, which reduces the cost associated with distributing the documents in a tangible paper form.

It is a further object of the present invention to provide a method of document distribution, which enables an employee evaluation firm to retain more control over its forms.

Yet another object of the present invention is to provide a method of document distribution which assures that more forms are completed by employees and not lost before the forms ever get to the employee to be filled out.

It is a further object of the present invention to provide a document distribution method which allows an employee evaluation firm more direct interaction with the businesses that purchase its services.

These, as well as the other objects and features of the present invention, will be apparent from the following detailed description and claims in conjunction with the accompanying drawings.

BRIEF SUMMARY OF THE INVENTION

A method of distributing documents includes the step of displaying the documents on a web site. Responses to the documents are accepted on the web site. After the responses have been accepted, they are processed into a report and the report is returned to an interested party. It is to be understood that the surveys or other forms to be completed by users could be filled out on paper manually and the results could then be entered into a computer and sent to the web site. The reports could be electronically transmitted, and/or hard copies sent via mail, overnight, or through other modes.

An optional feature of the invention is control over access and/or distribution to and/or from a web site. This access or distribution of documents and forms is performed by administration of passwords or similar access restrictions. The present invention can also include a method of providing employee evaluation services. The method of providing employee evaluation services includes providing employee evaluation forms on a web site. Responses to the evaluation forms are also accepted on a web site. After the responses have been accepted, the responses, or reports based on the responses are returned to an employer of the employee.

DETAILED DESCRIPTION OF AN EXEMPLARY EMBODIMENT

Figure 1:
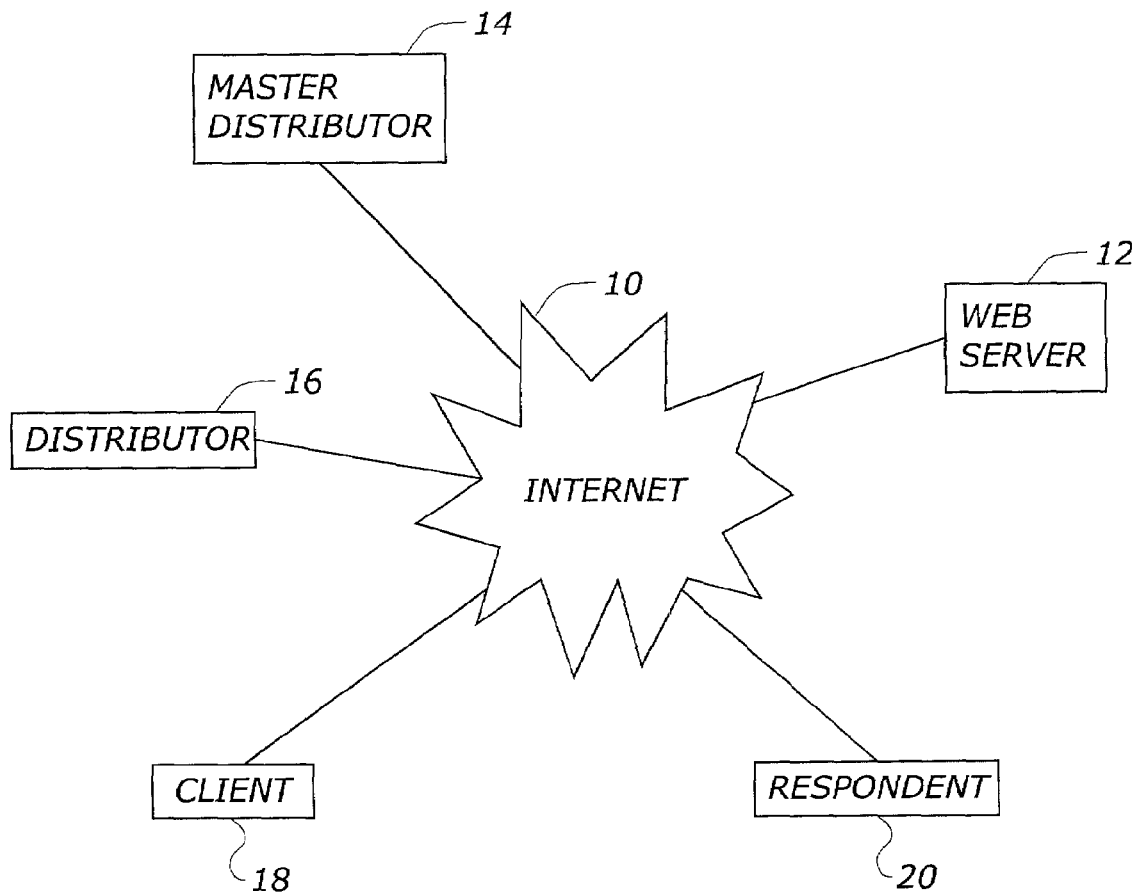
FIG. 1 is a block diagram, which illustrates various entities connected to an employee evaluation firm's web site through the Internet.

FIG. 1 is a block diagram, which illustrates a connection over the Internet 10 to a web server 12. An employee evaluation firm's web server 12 has employee evaluation questions and surveys on the web server 12. Note, while one application of the system is taking surveys to probe performance relative to jobs, other applications are possible. Various entities are able to access web server 12 and perform different functions on web server 12. A master distributor 14, a distributor 16, a client 18, and a respondent 20 are all able to access the web server 12. The functions that each one of these entities can perform on web server 12 is limited through password access to the web server 12. There can be an unlimited number of master distributors 14, distributors 16, clients 18, and respondents 20.

The tools used to implement the system described herein include the well-known DELPHI software and WEBHUB software (from HREF Tools, Corp.). The web server included a PENTIUM processor and a WINDOWS NT operating system. The users can access the web site using most standard web browsers, for example, NETSCAPE version 2.0 or above. Processing of the documents/surveys can be performed by a PC using a WINDOWS NT operating system. A T1 communications line was also used.

Figure 2:
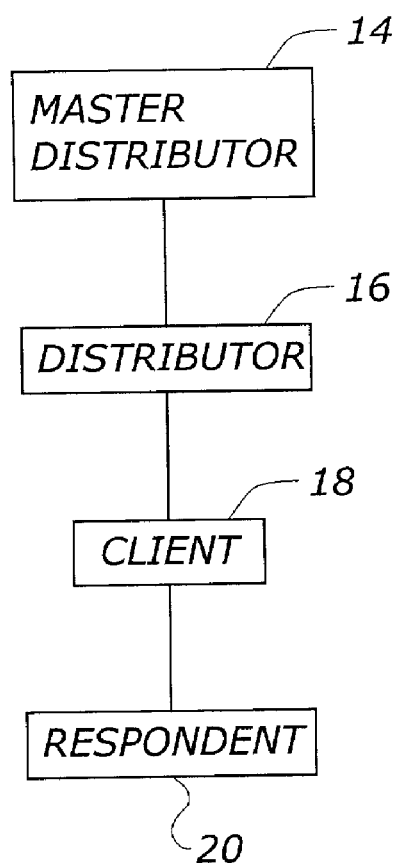
FIG. 2 is a block diagram, which illustrates the hierarchy of entities that can access the employee evaluation firm's web site.

FIG. 2 shows a block diagram of the hierarchy of entities that can access web server 12. The highest level access belongs to master distributor 14. Master distributor 14 can create response links, set up new accounts, manage reports, and change all account options. These functions will be discussed in more detail later. Master distributor 14 can view of all the sub-accounts it created.

The second level in the system is distributor 16. Distributor 16 can create response links, set up new accounts, manage reports, and change its personal account options. Distributor 16 can also see all of its sub-accounts.

The third level in the system is the client 18 level. Client 18 has the ability to create response links, manage reports, and change its personal account options. Client 18 can only see respondents and links it created.

The fourth level in the system is the respondent 20 level. The respondent 20 level is designed to allow an employee to respond to an instrument assigned to the respondent 20 level.

Figure 3:
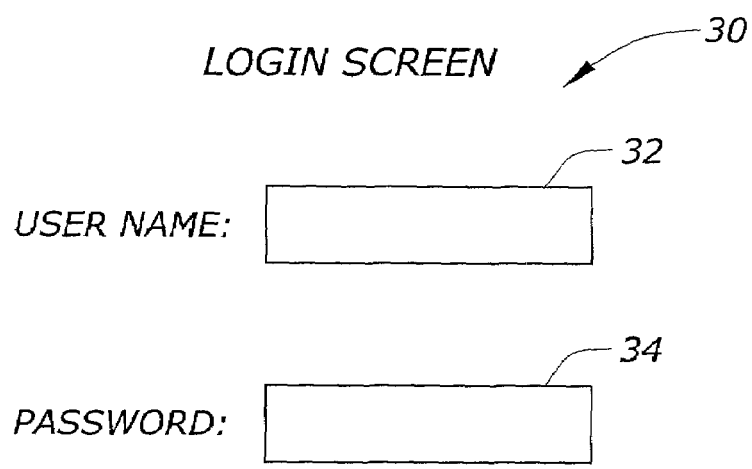
FIG. 3 is a diagrammatic view of a sign-on screen to access an employee evaluation firm's web site.

FIG. 3 is a diagrammatic representation of a login screen 30. The employee evaluation firm's web server 12 is accessed through the login screen 30. A user name 32 and a password 34 must be entered to gain access to the web server 12. The functions that an individual who logs onto the web server 12 can perform will be controlled by the permissions that are associated with the user name 32 and the password 34.

Figure 4:
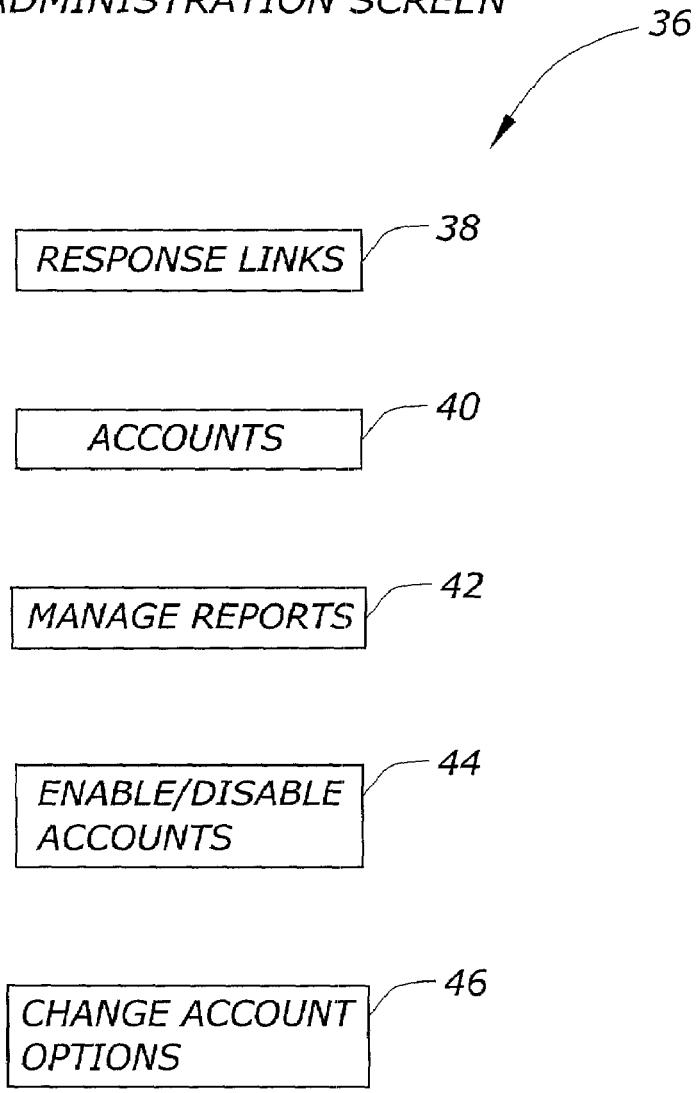
FIG. 4 is a diagrammatic representation of a screen display that would be seen upon logging-on to the employee evaluation firm's web site.

FIG. 4 shows a diagrammatic representation of a screen display of the web administration screen 36. The web administration screen 36 would be seen after logging in. There are a number of hypertext links on the web administration page. All of these links will take a user somewhere else within the employee evaluation firm's web site. The links that the user can choose from the web administration screen 36 are: response links 38, accounts 40, manage reports 42, enable/disable account 44, and change account options 46. Each of these links will lead to a different screen that will ask the user to enter certain information.

Figure 5:
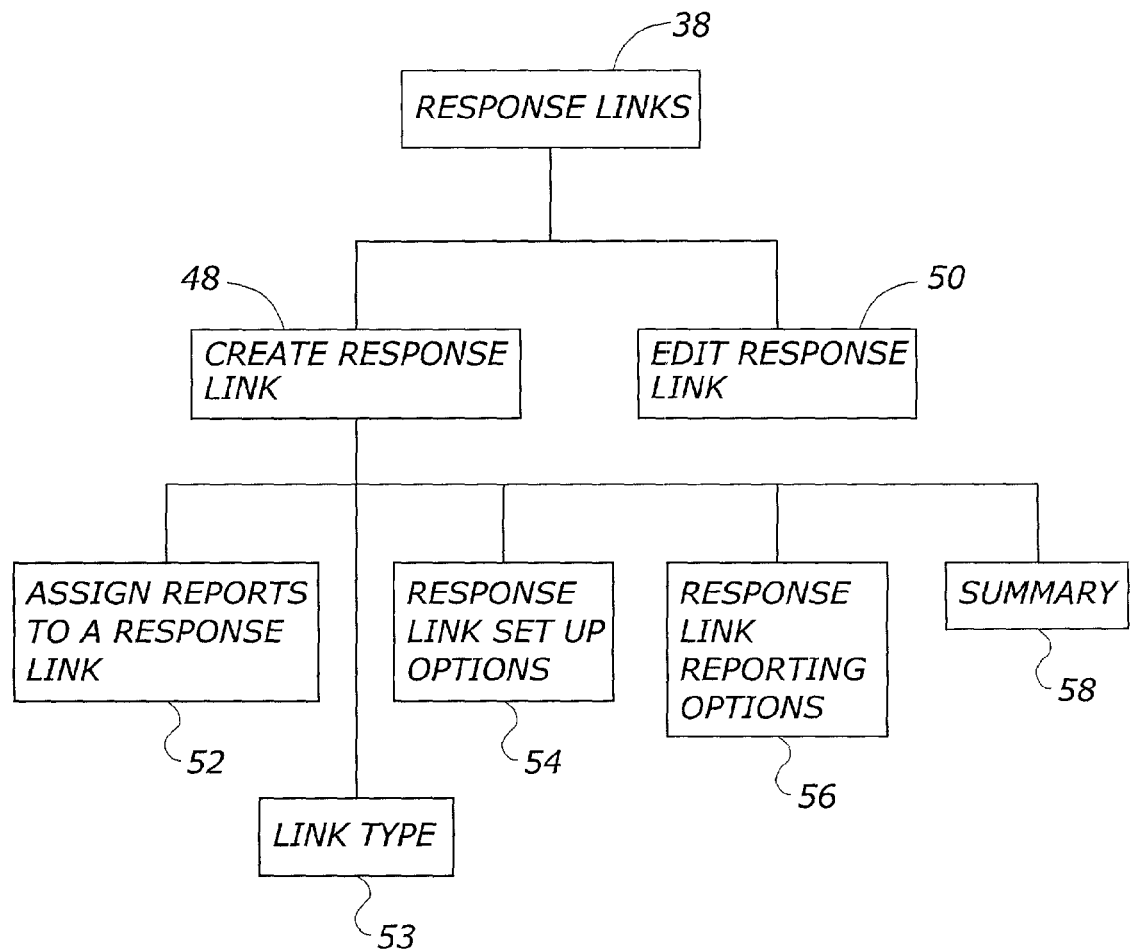
FIGS. 5–12 are block diagrams, which show in greater detail the menus and sub-menus associated with the links in FIG. 4.

FIG. 5 shows a block diagram of the functions that can be performed, or the information that will be asked for, after selecting response links 38. Response links 38 has two sub-menus, create response link 48 and edit response link 50. These sub-menus may be in the form of pull-down menus from clicking on response link 38, or they could be on separate screens reached after clicking on response link 38. Master distributor 14, distributor 16, and client 18 will all be able to set up response links. By selecting creates response link 48, a user will be able to assign a report(s) to a response link 52, set the link type 53, change the response link setup options 54, alter the response link reporting options 56, and view a summary 58 of the information that has been entered. Assign reports to response link 52, allows an administrator to assign multiple reports for a respondent to complete.

Figure 16:
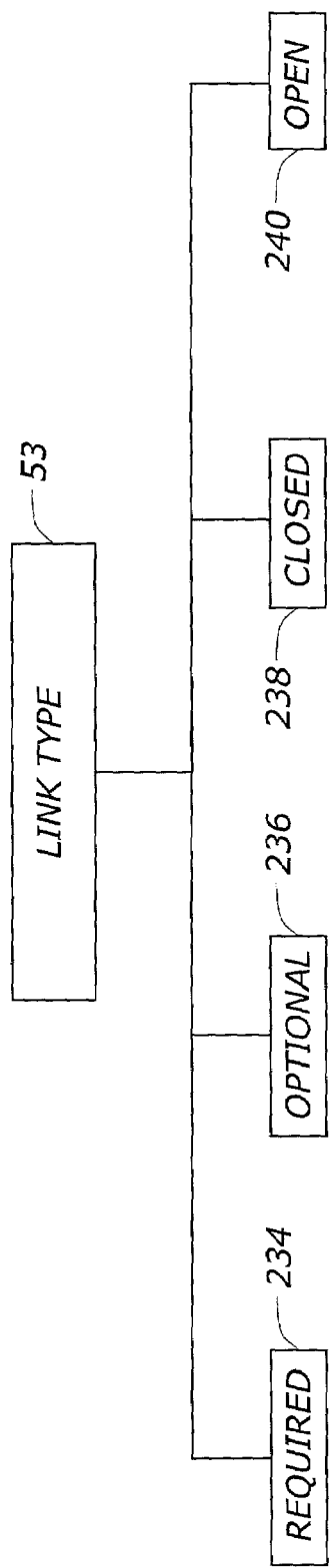
FIG. 16 is a block diagram which illustrates the functions available when selecting response link type.
Figure 17:
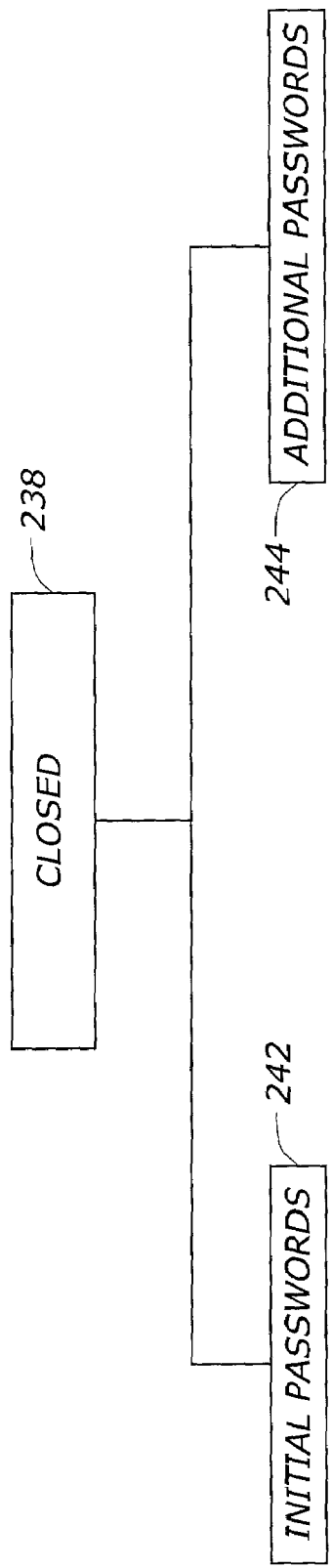
FIG. 17 is a block diagram depicting the options available to an administrator when the response link is closed.

Response link type 53 allows administrator to set the link type. FIG. 16 shows a block diagram of the functions that can be performed by selecting link type 53. The administrator can make assigned reports required 234 or grant optional 236, allowing respondents the ability to randomly complete assigned reports. The response link can be password protected by selecting close 238 or open access to all respondents by selecting open 240. If the administrator selects closed 238, FIG. 17 shows a block diagram of the options available to the administrator. The administrator can assign to the link an initial number of paswords 242. When editing a response link 50, the administrator can assign additional passwords 244 to the closed 238.

A report could be one that is designed to gauge an existing employee's aptitude for a present job or for a different job. The report could be one that is designed for an existing employee to evaluate a boss. The report could be one that is designed to evaluate a potential employee's suitability for a particular job. An example of the type of surveys or reports that could be presented to respondents can be found in incorporated U.S. Pat. No. 5,551,880. An example of how these surveys can be processed may be found in U.S. Pat. No. 5,551,880.

Figure 6:
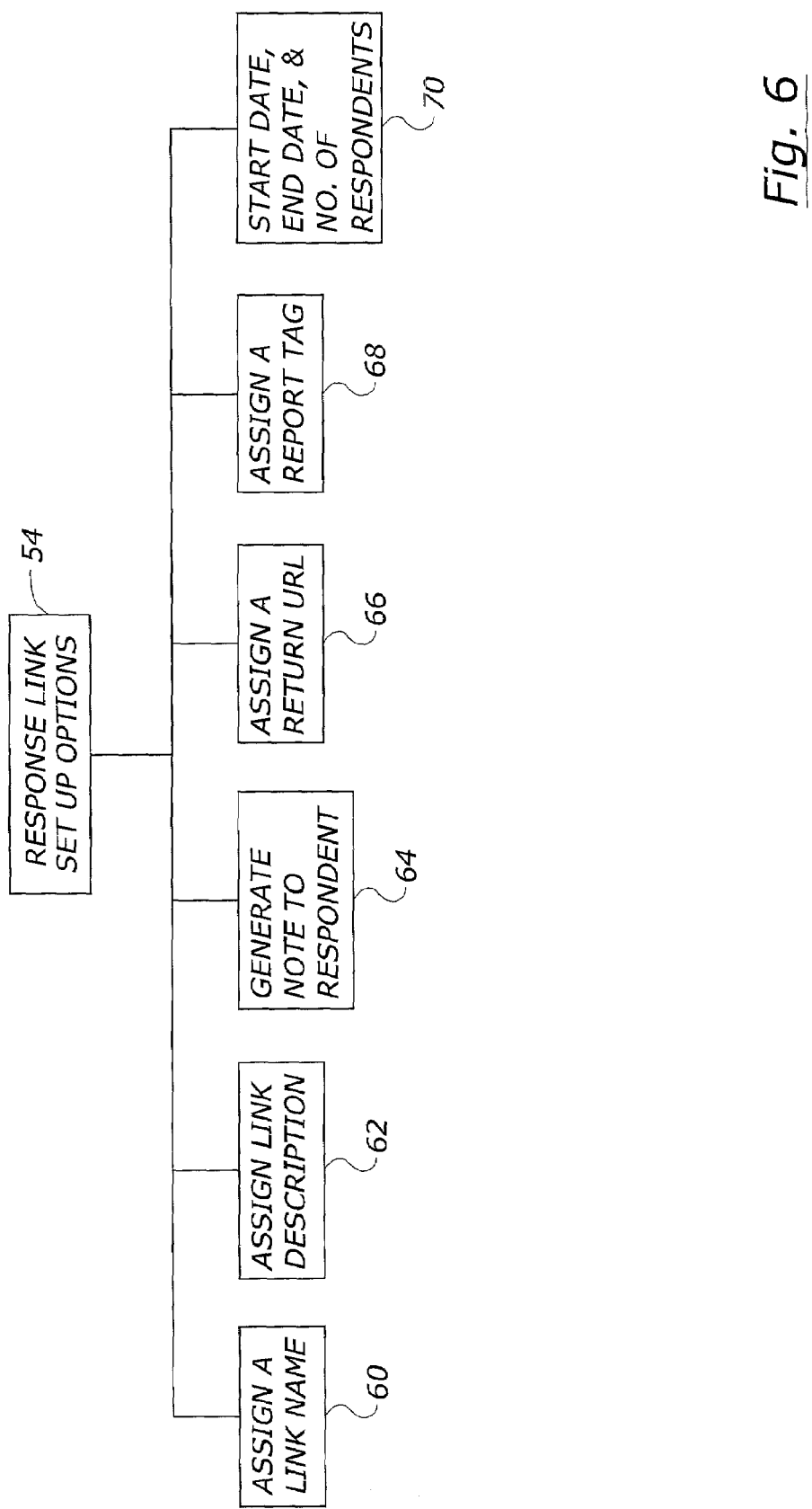

Response link setup options 54 allows the administrator to perform a number of different functions. FIG. 6 shows a block diagram of the functions that can be reformed by selecting response link setup options 54. The administrator can assign a link name 60 to the link. The administrator can assign a link description 62 and generate a note to respondent 64, which will be viewed by respondents when they answer the survey. In addition, an administrator can assign a return URL 66. The URL will take a respondent to a different site or a return web site. In addition, an administrator can assign a report tag 68 to the report. The report tag is usually some survey identifying information, which is attached to the bottom of each report generated from the link.

In addition, the response links setup options 54 also allows the administrator to establish a start date, end date, and number of respondents 70. Start and end dates establish when a link will first be available for respondents and when it will no longer be available. The approximate number of respondents identifies how many respondents will be responding to the link. Therefore, options attach to the number of respondents. First, an administrator can select "no limit or notification". In this case, if the number of respondents exceeds the number entered in block 70, the administrator will not be notified. Second, the administrator can select "notified only". If the number of respondents exceeds the number of respondents specified in block 70, the administrator will be notified the following day by e-mail. By selecting the "notified only option", the link will remain active. Third, the administrator may choose "deactivate link". If the number of respondents exceeds the number entered by the administrator, the administrator will be notified by e-mail the following day and the link will be deactivated. Finally, if the administrator selects required 234, then the number of initial passwords 242, and additional passwords 244, will determine the number of respondents allowed to respond before the link ID deactivated.

Figure 7:
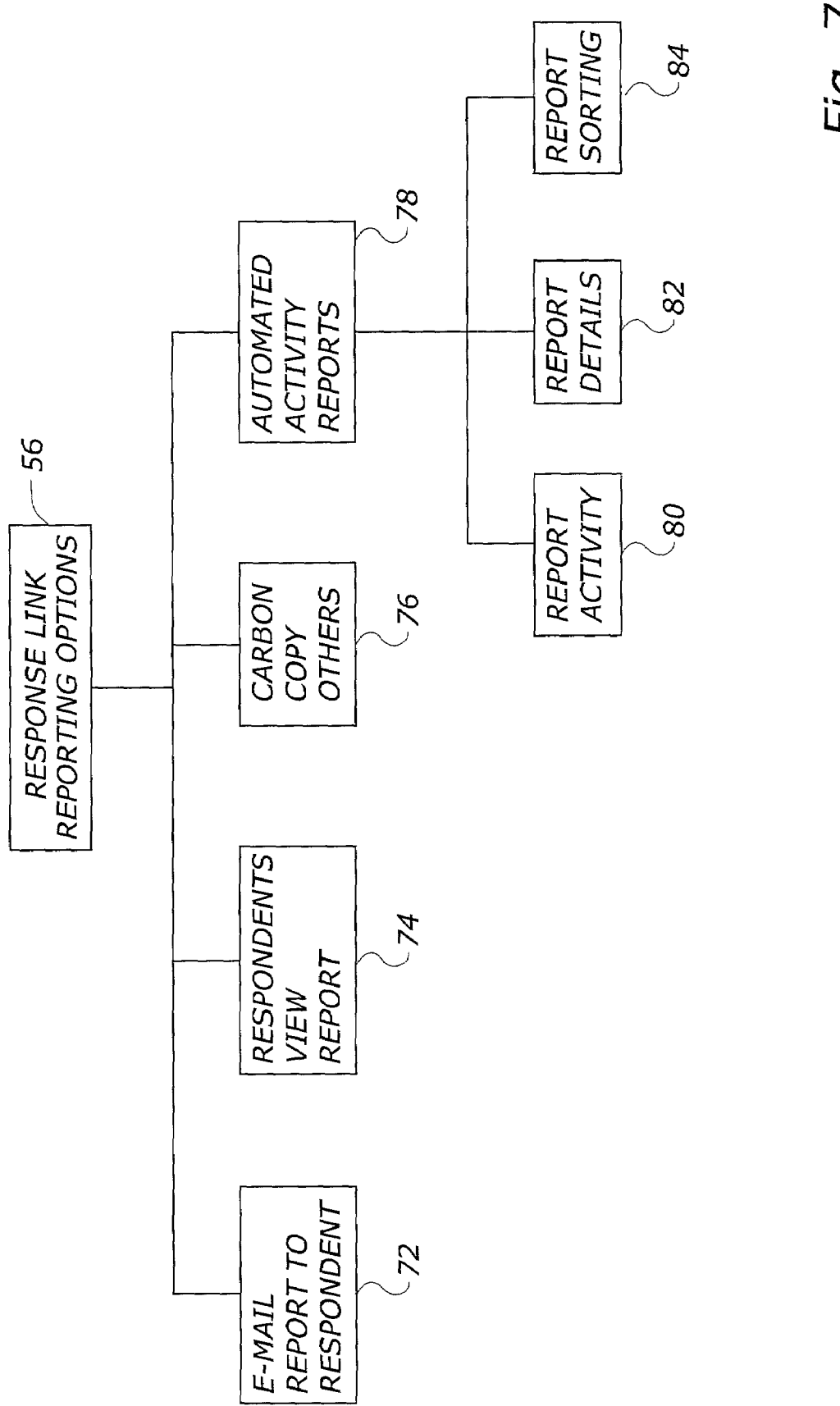

Create response link 48 menu also has a response link reporting options 56 submenu. FIG. 7 shows a block diagram of the response link reporting options 56. Response link reporting options 56 enables an administrator to control who will receive a report and when it will be received. The screen also allows the administrator to set up automated activity reports to keep track of who has responded to the link. An administrator could choose to e-mail a report to respondent 72, or allow respondents to view report online 74, or carbon copy the report to others 76. These options are not mutually exclusive, so the administrator could select all three options.

In addition, an administrator can choose the automated activity report 78. An administrator can choose report activity 80, report details 82, and report sorting 84. Report activity 80 allows an administrator to determine the frequency of e-mailed activity reports. An administrator can choose none, daily, weekly, and monthly for report activity 80. Depending on the frequency selected, an administrator will receive notification by e-mail of who has responded to the link.

Report details 82 allows an administrator to select how much detail is desired in the activity report. An administrator can choose to receive a report detailing who has responded to the link since the last report was generated. Alternatively, an administrator can elect to receive activity reports that cumulatively list all respondents. Report sorting 84 allows an administrator to sort the report alphabetically or by date. If alphabetically is selected, an administrator will receive reports listing all respondents alphabetically. If by date is selected, the administrator will see reports sorted by the date the respondents responded to the link.

The create response link 48 also has a summary screen 58 (FIG. 5). Summary screen 58 summarizes all previous screens from the create response link 48 menu, and allows the administrator to view options and make changes before saving and forwarding links to respondents.

Response links 38 also allows an administrator to choose edit response link 50. The edit response link 50 enables an account administrator to correct or modify a response link. An administrator can perform all of the functions that were previously discussed with respect to create response link 48 and its sub-menus, except for altering the type of instrument assigned to the link.

It should be pointed out that this system is completely automated. When the link is created or changed, the logged-in account administrator automatically receives an e-mail with all link information embedded. This e-mail is used to notify respondents and provide reference link details.

Figure 8:
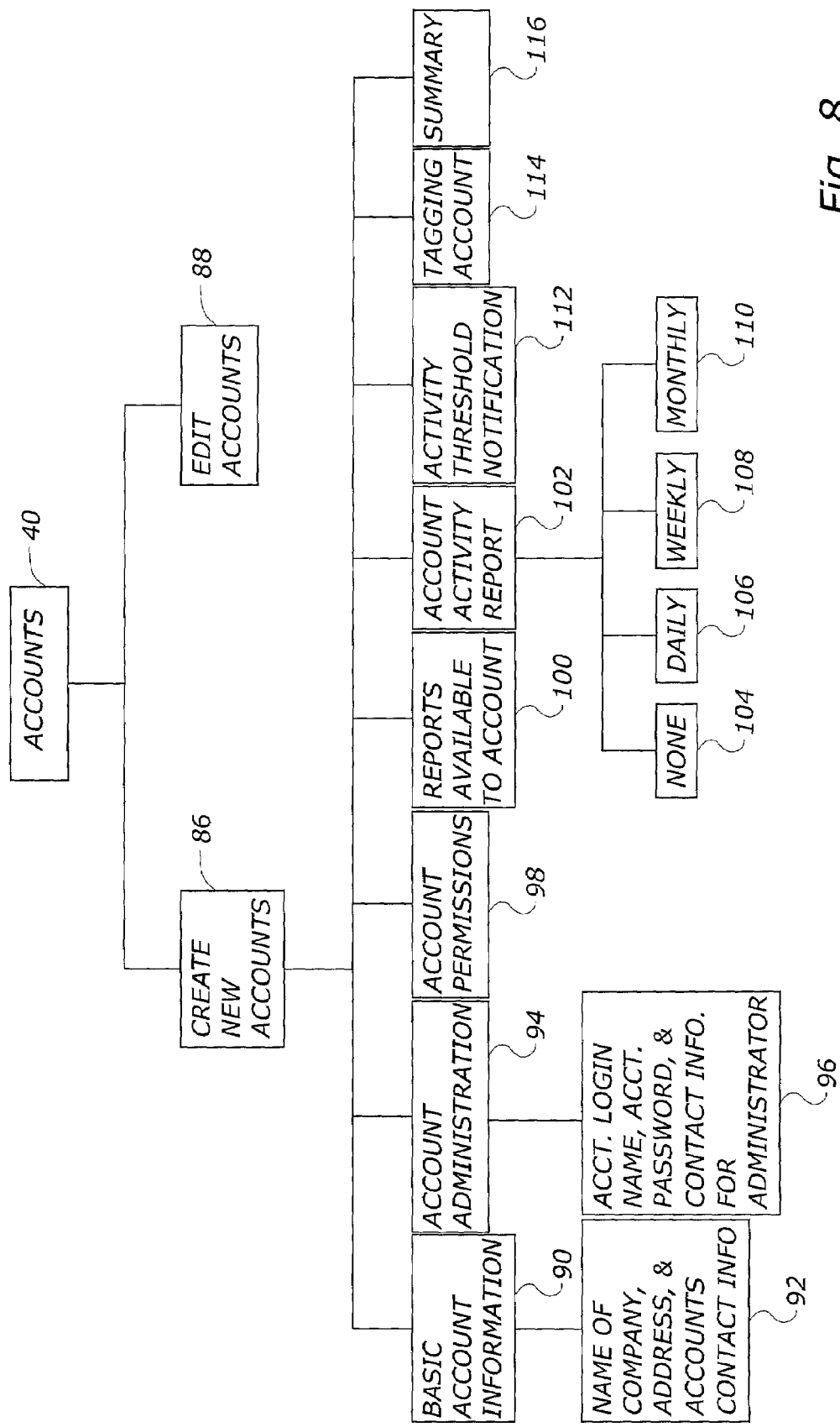

Referring back to FIG. 4, there is also an accounts 40 link. Accounts 40 are separated into two menu items, creating new accounts 86 and edit accounts 88. FIG. 8 shows a block diagram of the options that are available with account link 40. The create new accounts 86 menu allows a user to enter basic account information 90. The basic account information consists of the name of the company, the address of the company, and account contact information 92. The information that is gathered is used to identify the account. Create new accounts 86 also requires the name of an account administrator 94. The account administrator creates a login name, an account password, and contact information for the administrator 96. Contact information for the administrator consists of the administrator's name, telephone number, and current E-mail address. All activity reports for response links and the administrative reports will automatically be sent to the administrator's e-mail address.

Figure 9:
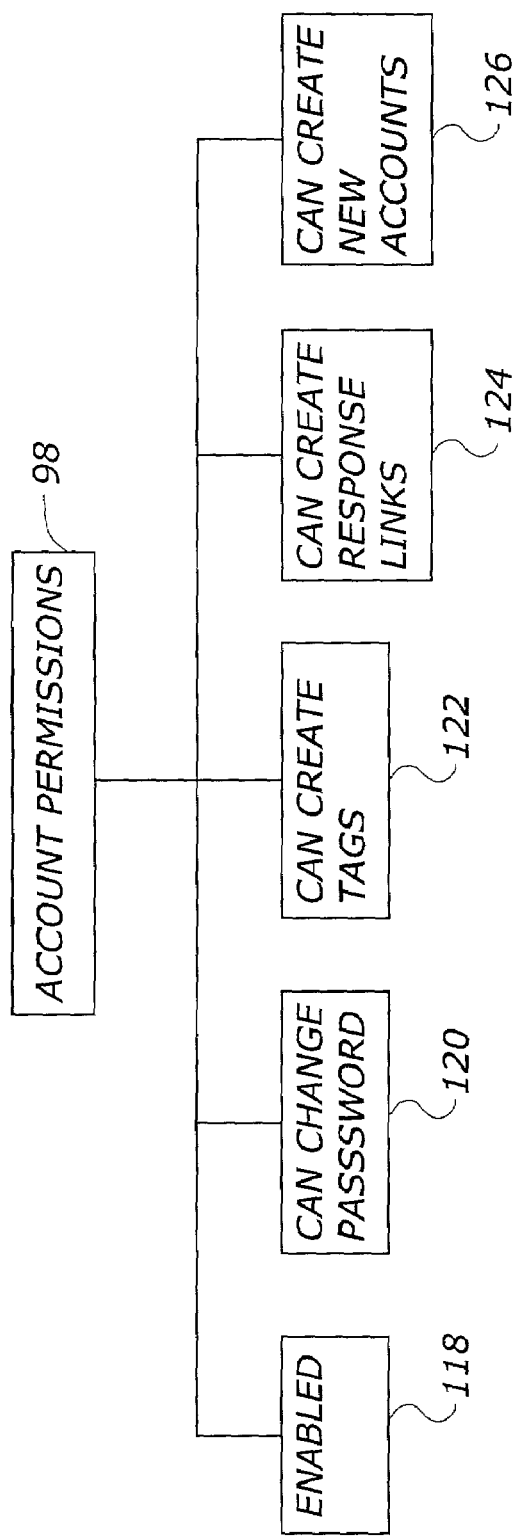

Within create new accounts 86, account permissions 98 are also established. FIG. 9 shows a block diagram of the options associated with account permissions 98. The account administrator can enable 118 the account. If account enable 118 is selected, the account and all of the sub-accounts associated with it will function. If enabled 118 is not selected, the account and all of its sub-accounts will not function.

When creating a new account, one option presented provides for setting whether the account holder can change their password. This option is the "can change password" option 120. If can change password 120 is selected, the account administrator will have the ability to change the account password. If can change password 120 is not selected, only the owner of the account will be able to change the account password.

The other options associated with account permissions 98 are: can create tags 122, can create response links 124, and can create new accounts 126. If these options are selected when a new account is set up, the account administrator will be able to perform the various functions. If these options are not selected when the account is created, then only the owner of the account, and not the account administrator, will be able to perform these functions.

Referring again to FIG. 8, under create new accounts 86, there is also a report available to account 100 option. Reports available to account 100 determines which reports an administrator will be able to assign to the links. Only the reports that are selected will be able to be assigned to links in the subsequent create links process. Note, any or all reports could be available for an account administrator to assign to a link.

When creating a new account, an account activity report 102 is also available. Account activity report 102 allows the account administrator to automatically receive a detailed accounting of reports generated by any sub-accounts. The account activity report frequencies are: none 104; daily 106; weekly 108; and monthly 110. Based on the selected frequency, the account administrator will receive a detailed accounting of the reports generated by the sub-accounts.

In creating a new account, an activity threshold notification 112 is also entered. Activity threshold notification 112 allows a user to set up reporting benchmarks for billing and information purposes. By entering a number of approximate reports in the activity threshold notification 112 screen, the system will automatically notify the account administrator if the parameters are exceeded. Note, the account will not terminate if the parameters are exceeded, the administrator will only be notified. If the administrator provides an approximate number of reports per day, week, month, or quarter, and the parameters are exceeded, the administrator will receive the e-mailed notification automatically. Of course, "no notification" could be selected and the administrator would not be notified if the parameter was exceeded.

Tagging account 114 allows an administrator to set the default tag for the account. This is the default tag for the new account and can be changed by an administrator of the new account, if the create tags 122 permission (FIG. 9) was selected.

After all of the information in create new accounts 86 has been entered, a summary 116 screen is displayed. The summary 116 screen allows the administrator to view and/or change the options set for the account before saving.

The accounts 40 menu also has an edit accounts 88 option. Edit accounts 88 allows the administrator to perform all of the functions that were previously discussed with respect to create new accounts 86 (assuming permission).

It should be noted that based on the options selected for the new account, the system automatically sends all notifications. The account administrator does not have to login to stay informed of the account activity.

Figure 10:
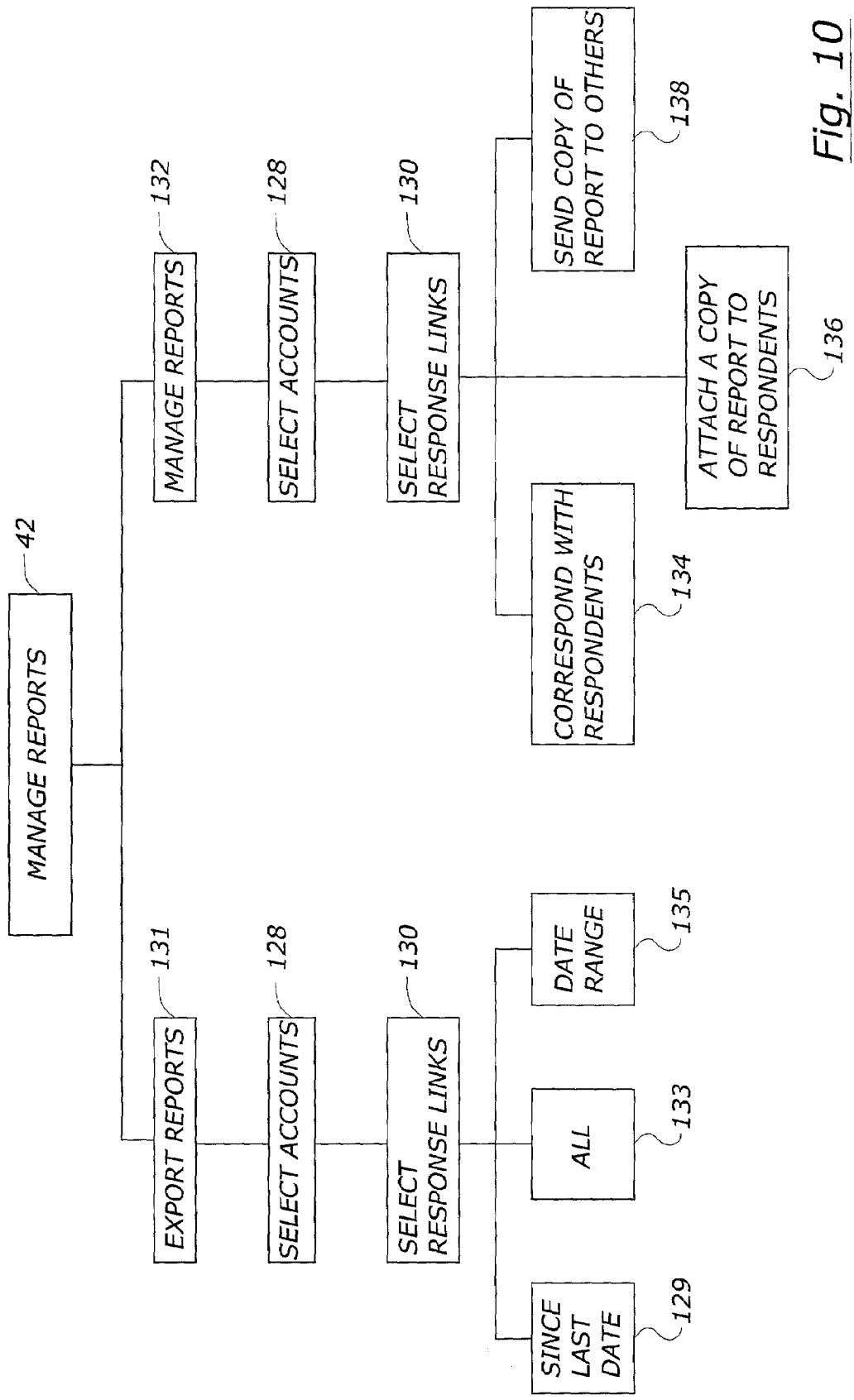

Returning to FIG. 4, the login screen also presents a manage reports 42 link. FIG. 10 shows a block diagram of the functions associated with manage reports 42. Submenus for manage reports 42 are export reports 131, and manage reports 132. Manage reports 42 allows an administrator to correspond with and e-mail reports to respondents by select accounts 128 and select response link 130. Export reports 131 allows an administrator to export scored reports by select accounts 128 and select response links 130.

Export reports 131 presents a screen asking for the type of export, since last date 129, all reports 133 and date range 135. If since last date 129 is selected, then only the reports completed since the last export for the select accounts 128 and select response links 130 will be exported and e-mailed to the administrator of the account for importing into the Managing For Success® software collection, available from Target Training International of Scottsdale, Ariz. If all reports 133 is selected, then all reports associated with the select accounts 128 and select response links 130 will be exported and e-mailed to the administrator for import into, e.g., the Managing for Success® software collection. If date range 135 is selected, then the start date and end date for export must be provided by the administrator for the select accounts 128 and select response links 130 and will be exported and e-mailed to the administrator for import into the Managing For Success® software collection.

Manage reports 132 presents a screen which displays all respondents which have responded to the response links which were chosen from select response links 130. The administrator can correspond with respondents, attach a copy of reports to respondents, or send a copy of reports to others from this screen. In corresponding with respondents, the administrator has two options. First, the administrator can correspond with respondents by typing a note in the note block that is presented on the screen, and selecting respondents with which to correspond. Alternatively, the administrator can correspond with respondents by typing a note in the note block, selecting respondents to correspond with, and attaching a copy of the respondents' report.

Figure 11:
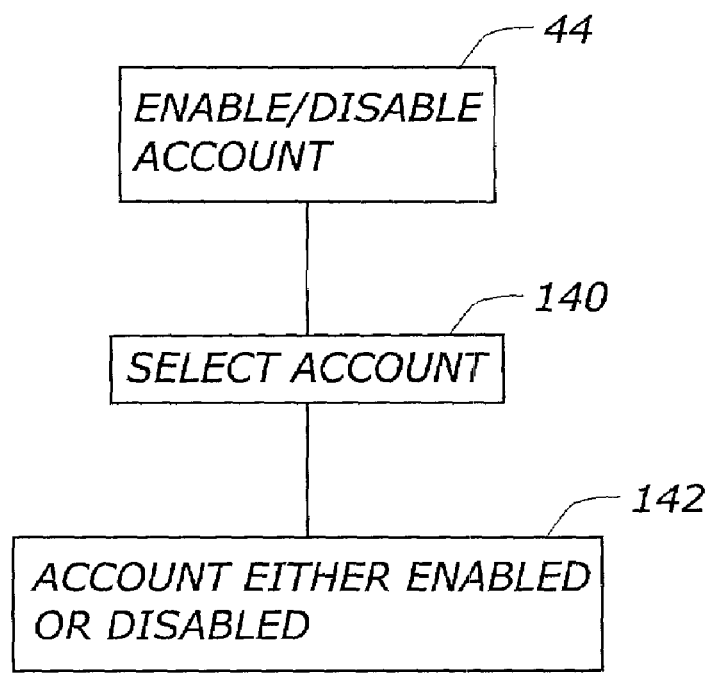

FIG. 11 shows a block diagram of the functions associated with enable/disable account 44 (FIG. 4). An account administrator can select an account 140. The select account 140 screen allows an administrator to select the account to enable or disable. Account either enabled or disabled 142 displays whether the selected account is enabled or disabled. This screen allows for enabling or disabling of the account. If the account is disabled, all of the sub-accounts will also be disabled.

Figure 12:
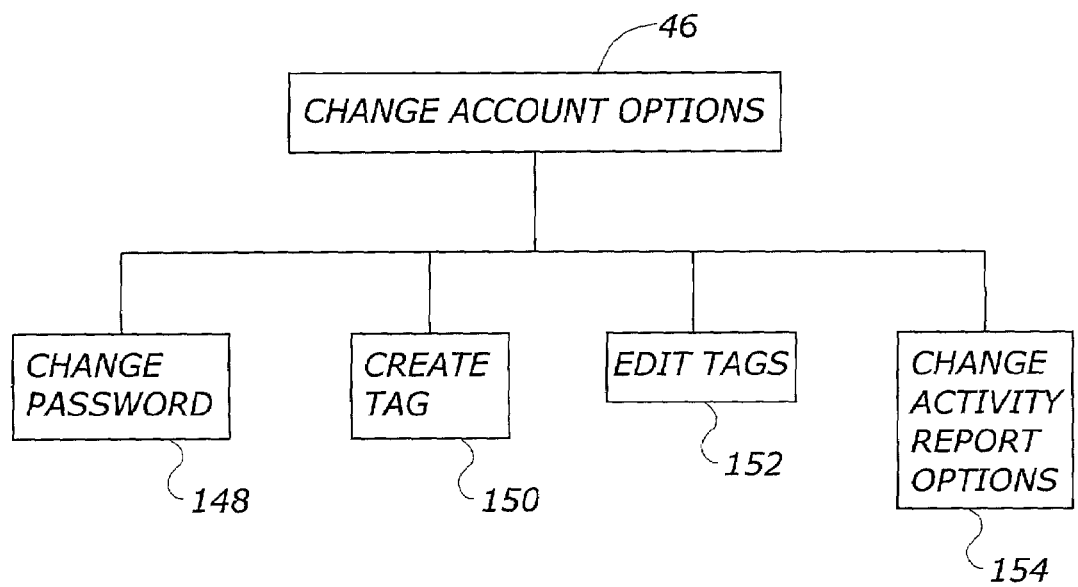

FIG. 12 shows a block diagram of change account options 46. Change account options 46 is divided into change password 148, create tag 150, edit tags 152, and change activity report options 154. Change password 148 allows a logged-in administrator to change the administrative password for the current account. Create tag 150 creates tag values which are displayed on the bottom of reports generated by this account. The account can create more than one tag and attach this tag to response links. Edit tags 152 allows the administrator to edit existing tags. Change activity report options 154 allows an administrator to change the frequency of activity reports for the current account.

Figure 13:
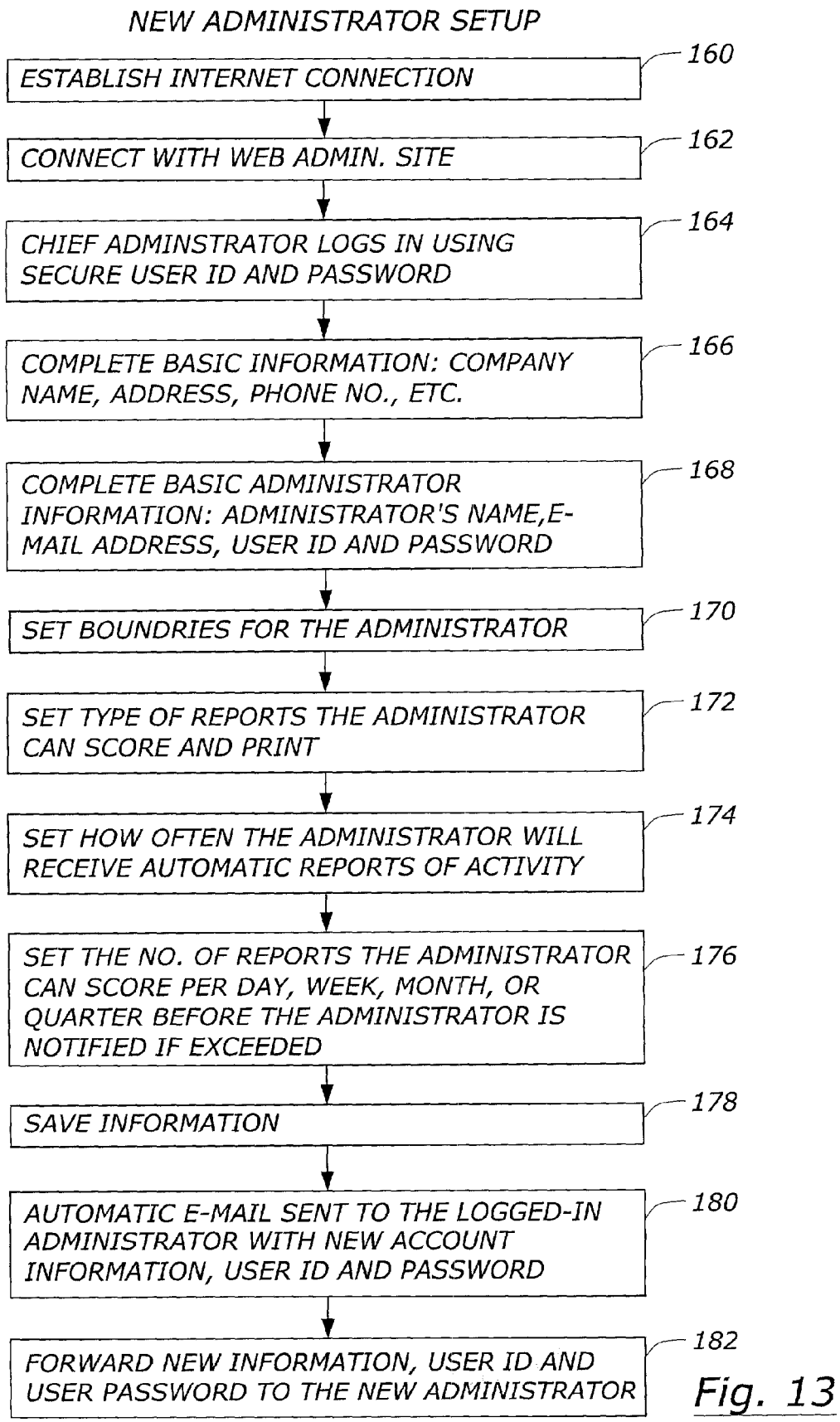
FIG. 13 is a flowchart, which illustrates the creation of a master distributor account.

FIG. 13 shows a flowchart which illustrates how a new account or account administrator for a master distributor can be established. A similar method can be used to establish distributor, client, and respondent levels. First, an Internet connection 160 is established by an administrator of the employee evaluation firm that controls the web site on web server 12. The connection to the Internet is conventional, such as, through a modem via an Internet service provider. After establishing an Internet connection 160, the administrator of the employee evaluation firm (also referred to as the chief administrator) connects to the administration web site 162 of the employee evaluation firm with a web browser. The administrator logs in 164 using a password and user ID and/or password.

The administrator enters in basic information 166 for the master distributor that the chief administrator is creating. The basic information includes the company name, address, telephone number, etc. of the master distributor. The chief administrator also enters basic information for the master distributor's administrator, such as the administrator's name, e-mail address, user ID, and password. The chief administrator also sets boundaries 170 for the master distributor's administrator. The boundaries may include, for example, whether the master distributor's administrator can change passwords or create new accounts.

The chief administrator sets the type of reports 172 that the master distributor can score and print, how often 174 the master distributor's administrator will receive activity reports, and the number of reports 176 the master distributor can score before its administrator is notified. After all the information has been entered, it is saved 178 into the secure server. Once the information is saved, an automatic e-mail 180 is sent to the logged in chief administrator. The e-mail contains the new account information, the user ID and the password for the master distributor's administrator. All of this information is forwarded 182 to the administrator of the newly created master distributor.

Figure 14:
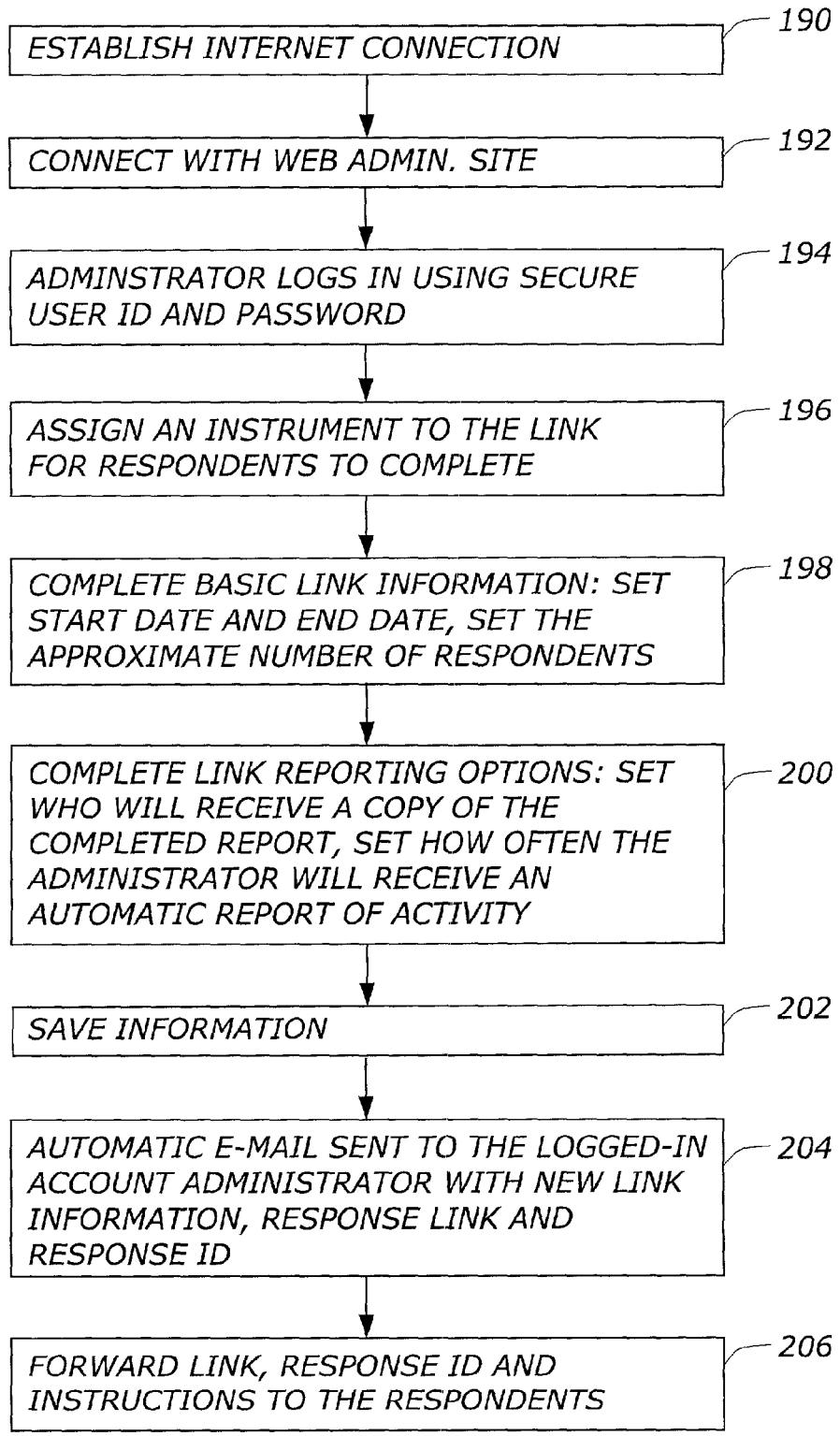
FIG. 14 is a flowchart, which illustrates the steps in creating a link to a survey.

FIG. 14 shows a flow chart of how a link to a survey (or instrument) can be created. An Internet connection 190 is established, and the administrator accesses the administration web site 192. The administrator logs in 194 using a secure user ID and password. The system will recognize the administrator based on the ID and password. The administrator's permissions and functions that he can perform on the web site are dictated by the password and user ID.

The administrator assigns an instrument 196 to the link for respondents to complete. The administrator completes basic link information 198, such as the start and end date and the approximate number of respondents. The administrator also completes the link reporting options 200, setting who will receive a copy of the completed report and how often the administrator will receive automatic reports of activity. After the information is entered, it is saved 202 into the secure server.

An automatic e-mail 204 is sent to the logged-in administrator. The e-mail contains the link information, response link, and response ID. The link, response ID, and instructions are subsequently forwarded 206 to respondents.

Figure 15:
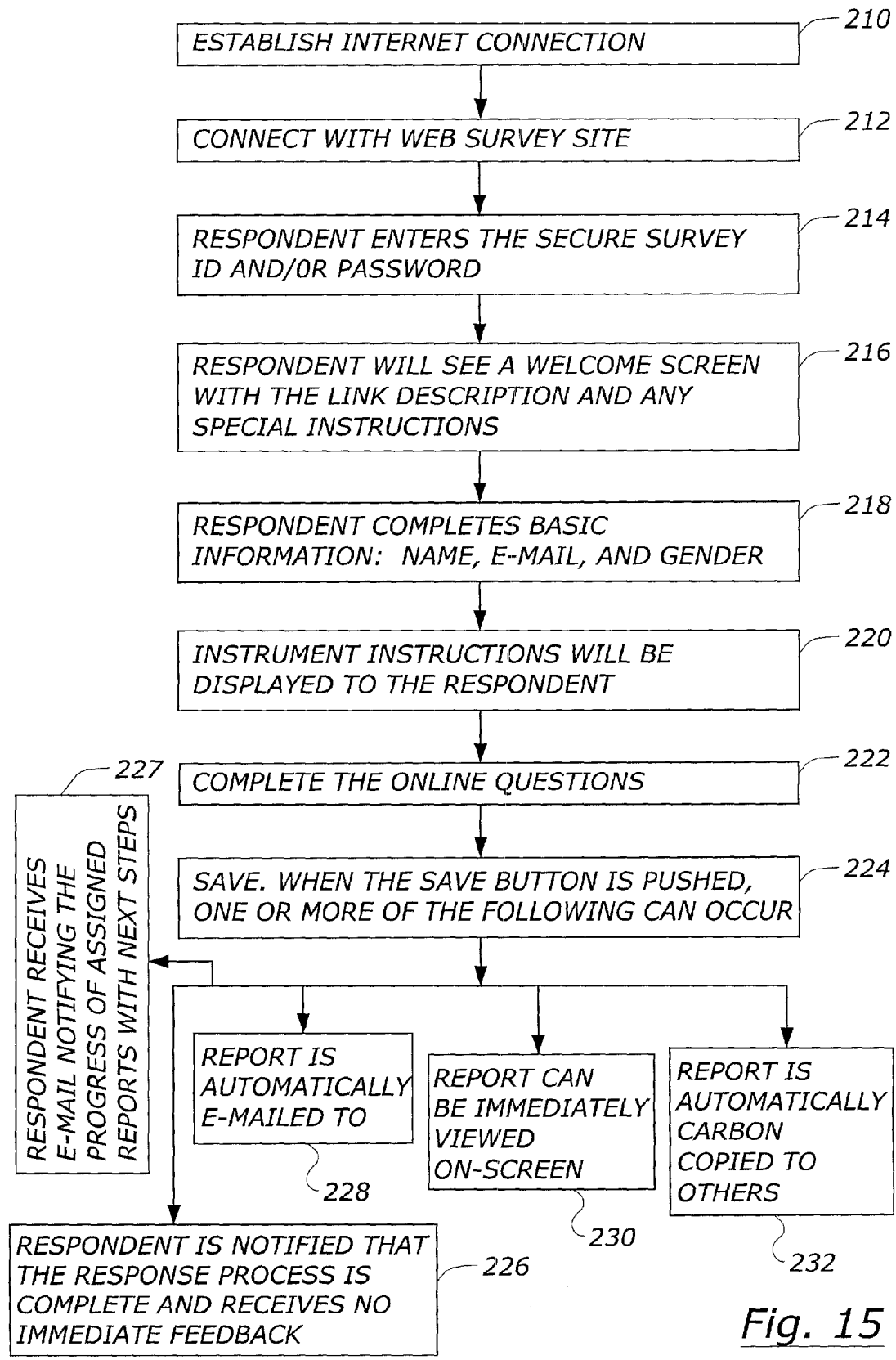
FIG. 15 is a flowchart, which illustrates the steps in responding to an instrument or survey.

FIG. 15 is a flowchart that illustrates the steps in responding to an instrument or survey. A respondent will need to establish an Internet connection 210 and access 212 the survey web site. A respondent enters the secure survey ID and/or password 214.

After logging-in, the respondent will see a welcome screen 216, which contains a description of the link and any special instructions. The respondent will need to click on the desired link. The respondent will be asked to enter basic information 218 such as the respondent's name, e-mail, and gender. Instructions 220 for answering the survey are displayed. The respondent then completes 222 the survey and clicks the save 224 button.

After the respondent clicks the save 224 button, one or more of the following will happen depending on how the select response links reporting options were set up by the administrator. The respondent could be notified 226 that the response process is complete and receive no immediate feedback on the survey. The respondent could also receive an assignment report 227 that indicates progress and future steps to be taken by the respondent. A report 228 could be automatically e-mailed to the respondent and a report 230 could be automatically e-mailed to the respondent and viewed on screen. Finally, the report could automatically be carbon copied (i.e. e-mail) to others.

Another aspect of the present invention involves the marketing network that can be used in association with the method of distributing documents over a network. Referring back to FIG. 2, as discussed earlier, any of the entities can create those below it. The employee evaluation firm can create master distributors. Rather than having the master distributor sell paper copies and set up conventional accounts with businesses, the master distributor in effect will be marketing/selling access to the forms through the web site, creating a web account.

Once a client account has been established, the employees who take the surveys will have to access the employee evaluation firm's web site. Thus, there will be a direct interaction between the client (or its employees) and the employee evaluation firm. Furthermore, by creating an account on the web site, the employee evaluation firm will be able to keep better track of which businesses utilize its services.

Thus, a method of distributing documents over a network has been disclosed which solve problems and deficiencies in the art. It will be readily apparent to those skilled in the art that any documents can be delivered over the Internet rather than on paper. It is intended that the present invention applies to any documents that can be distributed over the Internet. From the foregoing, it will be observed that numerous variations and modifications may be affected without departing from the spirit and scope of the novel concepts of the present invention. It is understood that no limitation with respect to the specific embodiment illustrated herein is intended or should be inferred. The terms and expressions which have been employed herein are used as terms of description and not of limitation. There is no intent in the use of such terms and expressions to exclude any future equivalents of features shown and described herein, but it is recognized that various modifications are possible within the scope of invention now claimed.

What is claimed is:

1. A method for managing distribution of assessment documents over a wide area comprising:
    (a) providing an assessment instrument for completion by respondents;
    (b) assigning a password for an entity having a level of rights;
    (c) initializing permissions relative to the password based on the level of rights for the entity, said permissions including at least one respondent password having permissions based on the level of rights for a respondent;
    (d) allowing the entity access to a web site on a global computer network and enabling the initialized permissions for the entity;
    (e) providing an assessment instrument to the respondent which gauges an individual potential employee's suitability with regards to a particular job, an individual existing employee's suitability or performance with regards to a particular job, or an individual boss's performance with regards to a particular job;
    (f) receiving responses from the respondent to the assessment instrument;
    (g) processing the responses into an assessment report;
    (h) sending the assessment report to one or more locations authorized by the permissions.

2. The method of claim 1 wherein the permissions associated with a master distributor level of rights include (a) ability to create response links and passwords, (b) ability to set up new accounts, (c) ability to manage reports, (d) ability to change its own and others' account options.

3. The method of claim 1 wherein the permissions associated with a distributor level of rights include (a) ability to create response links and passwords, (b) ability to set up new accounts, (c) ability to manage reports, (d) ability to change its own account options.

4. The method of claim 1 wherein the permissions associated with a client level of rights include (a) ability to create response links and passwords, (b) ability to manage reports, (c) ability to change account options.

5. The method of claim 1 wherein the permissions associated with a respondent level of rights include (a) respond to an assigned assessment instrument.

6. A system for managing assessments comprising:
    (a) a plurality of terminals each adapted to access a wide area network;
    (b) a central server;
    (c) software associated with the central server which administers a web site and which provides permissions;
    (d) a password having a set of permissions correlated to a respondent for an assessment survey which gauges an individual potential employee's suitability with regards to a particular job, an individual existing employee's suitability or performance, with regards to a particular job, or an individual boss's performance with regards to a particular job;
    (e) a password having a set of permissions correlated to an entity interested in the respondent's responses to the assessment survey specifics.

7. The system of claim 6 wherein the assessment relates to job or personal performance of a human.

8. The system of claim 6 wherein the assessment survey is electronic in nature or is hard copy in nature.

9. The system of claim 6 wherein the report is electronic in nature or is hard copy in nature.

10. The system of claim 6 wherein the set of permissions can vary from password to password.

11. A method of evaluation or assessment of persons, jobs, or employees comprising:
    (a) assigning a password for a respondent;
    (b) initializing a set of permissions relative to the password;
    (c) providing an assessment instrument which gauges an individual potential employee's suitability with regards to a particular job, an individual existing employee's suitability or performance with regards to a particular job, or an individual boss's performance with regards to a particular job to a respondent after verification of password;

(d) receiving responses from the respondent to the assessment instrument;

(e) processing the responses into an assessment report;

(f) sending the assessment report to one or more locations authorized by the set of permissions associated with the password.

* * * * *

(12) EX PARTE REEXAMINATION CERTIFICATE (10470th)
United States Patent
Bonnstetter et al.

(10) Number: US 7,249,372 C1
(45) Certificate Issued: Jan. 12, 2015

(54) NETWORK BASED DOCUMENT DISTRIBUTION METHOD

(75) Inventors: Bill J. Bonnstetter, Scottsdale, AZ (US); David R. Bonnstetter, Phoenix, AZ (US); Rodney Cox, Gatesville, TX (US)

(73) Assignee: Target Training International, Ltd, Scottsdale, AZ (US)

Reexamination Request:
No. 90/011,434, Apr. 4, 2011

Reexamination Certificate for:
Patent No.: 7,249,372
Issued: Jul. 24, 2007
Appl. No.: 09/760,145
Filed: Jan. 12, 2001

Related U.S. Application Data

(60) Provisional application No. 60/176,420, filed on Jan. 14, 2000.

(51) Int. Cl.
G06F 7/04 (2006.01)
G06F 11/34 (2006.01)
H04L 9/32 (2006.01)
H04L 9/00 (2006.01)

(52) U.S. Cl.
USPC .................. 726/5; 705/51; 705/7.42; 705/76; 713/183; 726/27

(58) Field of Classification Search
USPC .............................................................. 726/5
See application file for complete search history.

(56) References Cited

To view the complete listing of prior art documents cited during the proceeding for Reexamination Control Number 90/011,434, please refer to the USPTO's public Patent Application Information Retrieval (PAIR) system under the Display References tab.

*Primary Examiner* — Joshua Campbell

(57) ABSTRACT

A method of distributing documents includes the step of displaying the documents on a web site. Responses to the documents are accepted on the web site. After the responses have been accepted, they are processed into a report and the report is returned to an interested party. It is to be understood that the surveys or other forms to be completed by users could be filled out on paper manually and the results could then be entered into a computer and sent to the web site. The reports could be electronically transmitted, and/or hard copies sent via mail, overnight, or through other modes.

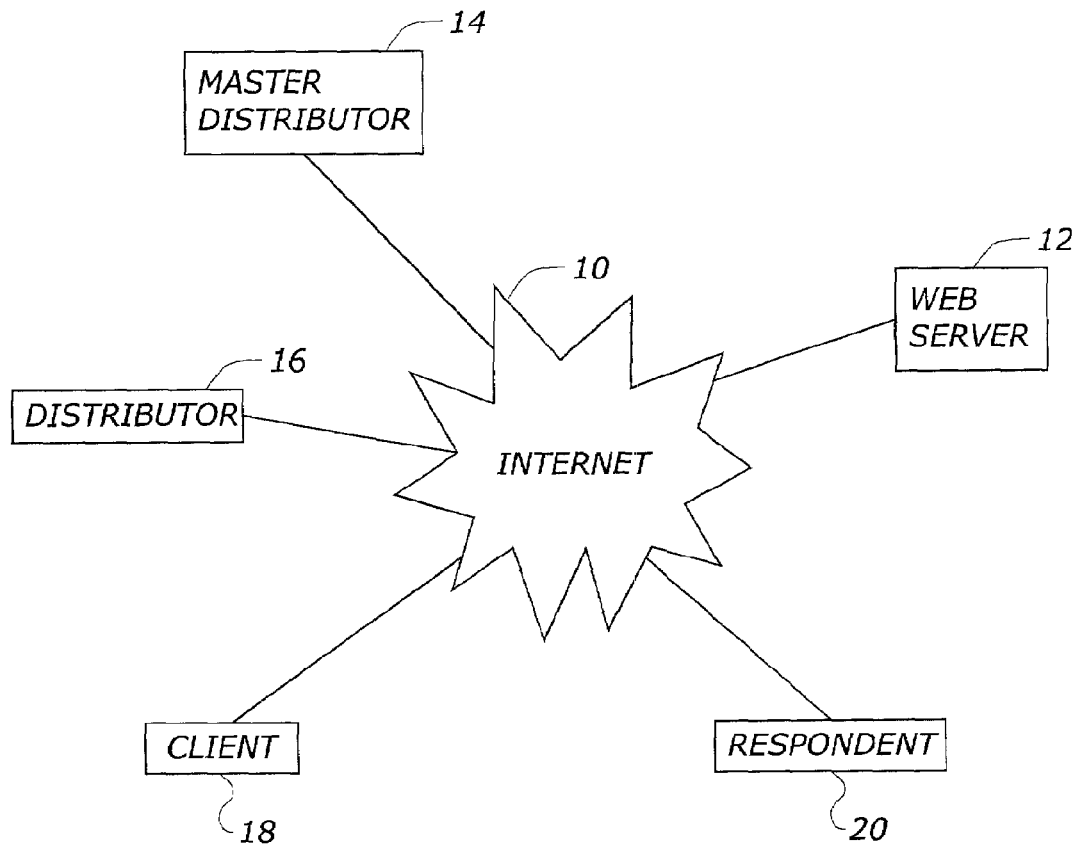

US 7,249,372 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-11 are cancelled.

New claims 12-41 are added and determined to be patentable.

*12. A method for managing distribution of assessment documents over a wide area comprising: (a) providing an assessment instrument for completion by respondents; (b) assigning a password for an entity having a level of rights; (c) initializing permissions relative to the password based on the level of rights for the entity, said permissions including at least one respondent password having permissions based on the level of rights for a respondent; (d) allowing the entity access to a web site on a global computer network and enabling the initialized, permissions for the entity; (e) providing an assessment instrument to the respondent which gauges an individual potential employee's suitability with regards to a particular job, an individual existing employee's suitability or performance with regards to a particular job, or an individual boss's performance with regards to a particular job; (f) receiving responses from the respondent to the assessment instrument; (g) processing the responses into an assessment report; (h) sending the assessment report to one or more locations authorized by the permissions;*

*wherein said managing distribution of assessment documents includes employee evaluation for one or more of said entities; said employee evaluation is by an employee evaluation services company; said entities are independent except for a business relationship regarding provision of said employee evaluation services; the business relationship relates to said assessment instruments and assessment reports; and the assessment instrument asks for responses from respondents related to: a. behavioral characteristics, and b. traits of good employees.*

*13. A method for managing distribution of assessment documents over a wide area comprising: (a) providing an assessment instrument for completion by respondents; (b) assigning password for an entity having as level of rights; (c) initializing permissions relative to the password based on the level of rights for the entity, said permissions including at least one respondent password having permissions based on the level of rights for a respondent; (d) allowing the entity access to a web site on a global computer network and enabling the initialized permissions for the entity; (e) providing an assessment instrument to the respondent which gauges an individual potential employee's suitability with regards to a particular job, an individual existing employee's suitability or performance with regards to a particular job, or an individual boss's performance with regards to a particular job; (f) receiving responses from the respondent to the assessment instrument; (g) processing the responses into an assessment report; (h) sending the assessment report to one or more locations authorized by the permissions;*

*wherein said managing distribution of assessment documents includes employee evaluation for one or more of said entities; and the assessment report comprises analysis regarding: an individual employee and prediction of:*
  *i. an individual potential employee's suitability with regards to said particular job;*
  *ii. an individual existing employee's suitability or performance with regards to said particular job, or*
  *iii. an individual boss's performance with regards to said particular job; and the analysis relates to: behavioral characteristics of humans and traits of good employees for the particular job.*

*14. A method for managing distribution of assessment documents over a wide area comprising: (a) providing an assessment instrument for completion by respondents; (b) assigning a password for an entity having a level of rights; (c) initializing permissions relative to the password based on the level of rights for the entity, said permissions including at least one respondent password having permissions based on the level of rights for a respondent; (d) allowing the entity access to a web site on a global computer network and enabling the initialized permissions for the entity; (e) providing an assessment instrument to the respondent which gauges an individual potential employee's suitability with regards to a particular job, an individual existing employee's suitability or performance with regards to a particular job, or an individual boss's performance with regards to a particular job; (f) receiving responses from the respondent to the assessment instrument; (g) processing the responses into an assessment report; (h) sending the assessment report to one or more locations authorized by the permissions; wherein said managing distribution of assessment documents includes employee evaluation for one or more of said entities; and said entities are separate businesses.*

*15. A method for managing distribution of assessment documents over a wide area comprising; (a) providing an assessment instrument for completion by respondents; (b) assigning a password for an entity having a level of rights; (c) initializing permissions relative to the password based on the level of right for the entity, said permissions including at least one respondent password having permissions based on the level of rights for a respondent; (d) allowing the entity access to a web site on a global computer network and enabling the initialized permissions for the entity; (e) providing an assessment instrument to the respondent which gauges an individual potential employee's suitability with regards to a particular job, an individual existing employee's suitability or performance with regards to a particular job, or an individual boss's performance with regards to a particular job; (f) receiving responses from the respondent to the assessment instrument; (g) processing the responses into an assessment report; (h) sending the assessment report to one or more locations authorized by the permissions; wherein said managing distribution of assessment documents includes employee evaluation for one or more of said entities; said employee evaluation is by an employee evaluation services company; and said entities are independent except for a business relationship regarding provision of said employee evaluation services.*

*16. The method of claim 15 wherein the business relationship relates to said assessment instruments and assessment reports.*

*17. The method of claim 16 further comprising creating accounts with account permissions for said entities.*

18. The method of claim 17 wherein said account permissions relate to one or more of:
   a. options associated with an account; or
   b. functions an entity can perform.

19. The method of claim 18 further comprising setting up reporting benchmarks for billing or information relative to an account.

20. The method of claim 18 wherein the business of the employee assessment services company includes one or more of:
   a. control of content of assessment instruments and assessment reports;
   b. fostering business relationships with other said entities; and
   c. generating revenue.

21. The method of claim 20 wherein a said master distributor comprises a marketer or seller of said assessment instruments related to employee evaluation services of the employee evaluation services company.

22. The method of claim 21 wherein the permissions relate to access or receipt of assessment reports.

23. The method of claim 22 wherein access to or receipt of assessment reports is selected from the group consisting of:
   a. electronic;
   b. hard copy;
   c. via email;
   d. via mail; and
   e. via overnight delivery.

24. The method of claim 23 wherein said employees are:
   a. present employees; or
   b. potential employees.

25. The method of claim 24 wherein the employees to have access to the assessment instrument are identified by:
   a. the employer;
   b. the employee; or
   c. a third party.

26. The method of claim 22 wherein the enabling or disabling of permissions can be based on compliance of the master distributor with a business relationship with the employee evaluation services firm.

27. The method of claim 26 wherein the enable or disabling of permissions can relate to:
   a. one permission of an entity; or
   b. all permissions of an entity.

28. The method of claim 27 wherein permissions of the master distributor or distributor are established.

29. The method of claim 26 wherein the permissions relate to access to or receipt of assessment reports.

30. The method of claim 26 wherein the permissions can be enabled or disabled by the employee evaluation services company.

31. The method of claim 26 wherein the employee assessment services company sends an assessment report according to the permissions established for the client.

32. The method of claim 22 wherein the enabling or disabling of permissions can be based on compliance of the master distributor with a business relationship with the employee evaluation services company.

33. The method of claim 21 wherein said distributor is subordinate to a said master distributor.

34. The method of claim 33 wherein the present employees are:
   a. bosses or managers; or
   b. persons under a boss or manager.

35. The method of claim 20 wherein a said distributor comprises a marketer or seller of said assessment instruments, assessment reports, or employee evaluation services of the employee evaluation services firm.

36. The method of claim 35 wherein access to or receipt of assessment reports is selected from the group consisting of:
   a. electronic;
   b. hard copy;
   c. via email;
   d. via mail;
   e. via overnight delivery.

37. The method of claim 36 wherein the job relates to at least one of:
   a. management of others;
   b. sales of goods or services;
   c. present job of the respondent;
   d. a different job than present job of the respondent; or
   e. performance of another person in a job.

38. A method for managing distribution of assessment documents over a wide area comprising: (a) providing an assessment instrument for completion by respondents; (b) assigning a password for an entity having a level of rights; (c) initializing permissions relative to the password based on the level of rights for the entity, said permission including at least one respondent password having permissions based on the level of rights for a respondent; (d) allowing the entity access to a web site on a global computer network and enabling the initialized permissions for the entity; (e) providing an assessment instrument to the respondent which gauges an individual potential employee's suitability with regards to a particular job, an individual existing employee's suitability or performance with regards to a particular job, or an individual boss's performance with regards to a particular job; (f) receiving responses from the respondent to the assessment instrument; (g) processing the responses into an assessment report; (h) sending the assessment report to one or more locations authorized by the permissions;
   wherein said managing distribution of assessment documents includes employee evaluation for one or more of said entities; said employee evaluation is by an employee evaluation services company; and said entities comprise:
   a. one or more master distributors;
   b. one or more distributors; or
   c. one or more clients;
   and wherein permissions for an account for the master distributor are related to:
   a. distribution of assessment instruments; and
   b. set up of web-based sub-accounts related to distributors and clients;
   and the permissions can be enabled or disabled by the employee evaluation services firm.

39. The method of claim 38 wherein the master distributor or distributor resell assessment instruments to said client and the employee assessment services company generates an assessment report for one or more employees of the client.

40. A method for managing distribution of assessment documents over a wide area comprising: (a) providing an assessment instrument for completion by respondents; (b) assigning a password for an entity having a level of rights; (c) initializing permissions relative to the password based on the level of rights for the entity, said permissions including at least one respondent password having permissions based on the level of rights for a respondent; (d) allowing the entity access to a web site on a global computer network and enabling the initialized permissions for the entity; (e) providing an assessment instrument to the respondent which gauges an individual potential employee's suitability with regard to a particular job, an individual existing employee's suitability or performance with regards to a particular job, or an individual boss's performance with regards to a particular job; (f) receiving responses from the respondent to the assessment instrument; (g) processing the responses into an assessment report; (h) sending the assessment report to one or more locations authorized by the permissions;

wherein said managing distribution of assessment documents includes employee evaluation for one or more of said entities; said employee evaluation is by an employee evaluation services company; and said entities comprise:
    a. one or more master distributors;
    b. one or more distributors; or
    c. one or more clients;
and wherein permissions for an account for the master distributor are related to:
    a. distribution of assessment instruments; and
    b. set up of web-based sub-accounts related to distributors and clients;
and said client comprises an employer of employees.

41. A method for managing distribution of assessment documents over a wide area comprising: a) providing an assessment instrument for completion by respondents; (b) assigning a password for an entity having a level of rights; (c) initializing permissions relative to the password based on the level of rights for the entity, said permissions including at least one respondent password having permissions based on the level of rights for a respondent; (d) allowing the entity access to a web site on a global computer network and enabling the initialized permissions for the entity; (e) providing an assessment instrument to the respondent which gauges an individual potential employee's suitability with regards to a particular job, an individual existing employee's suitability performance with regards to a particular job, or an individual boss's performance with regards to a particular job; (f) receiving responses from the respondent to the assessment instrument; (g) processing the response into an assessment report; (h) sending the assessment report to one or more locations authorized by permissions;

wherein said managing distribution of assessment documents includes employee evaluation for one or more of said entities; said employee evaluation is by an employee evaluation services company; and said entities comprise:
    a. one or more master distributors;
    b. one or more distributors; or
    c. one or more clients;
and wherein permissions for an account for the master distributor are related to:
    a. distribution of assessment instruments; and
    b. set up of web-based sub-accounts related to distributors and clients; and
said client deals with both a master distributor or distributor and the employee assessment services firm.

* * * * *